(12) United States Patent
Yeo et al.

(10) Patent No.: US 6,205,096 B1
(45) Date of Patent: Mar. 20, 2001

(54) METHOD FOR TESTING QUALITY OF AN OPTICAL DISK MEDIUM

(75) Inventors: Woon-Seong Yeo; Hyung-Kyu Kim, both of Cheongju (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 08/989,660

(22) Filed: Dec. 12, 1997

(30) Foreign Application Priority Data

Dec. 19, 1996 (KR) ................................. 96-68282

(51) Int. Cl.⁷ ....................................... G11B 3/90
(52) U.S. Cl. ................... 369/53.12; 369/53.31; 369/53.37; 369/124.15
(58) Field of Search ................. 369/54, 58, 59, 369/44.32, 275.3, 53, 124.15, 116, 44.27, 44.29

(56) References Cited

U.S. PATENT DOCUMENTS

| | | |
|---|---|---|
| 5,256,965 | 10/1993 | Nomura . |
| 5,485,444 * | 1/1996 | Kuhn et al. ................. 369/58 X |
| 5,530,687 | 6/1996 | Yamaguchi . |
| 5,696,756 * | 12/1997 | Fujimoto et al. ............. 369/58 X |

* cited by examiner

Primary Examiner—Paul W. Huber

(57) ABSTRACT

The method and apparatus for testing the quality of an optical disk medium records test data in the outer area of an optical disk. This outer area of the optical disk is not used when manufacturing a prerecorded disk, and is also not used by users of write-once optical disks. The quality of the optical disk is judged based on the test signal produced from reproducing the test data in the outer area of the optical disk.

2 Claims, 10 Drawing Sheets

METHOD FOR TESTING QUALITY OF AN OPTICAL DISK MEDIUM

BACKGROUND OF THE INVENTION

1. Field of the Invention

The present invention relates to a method and apparatus for testing the quality of an optical disk medium and an optical disk medium; and more particularly, to such a method and apparatus having improved accuracy and reliability.

2. Description of Related Art

Disk media are divided into two groups, magnetic disks and optical disks such as compact disks (CDs). Because of their large storage capacity, the demand for optical disks has rapidly increased.

Figure 1A:
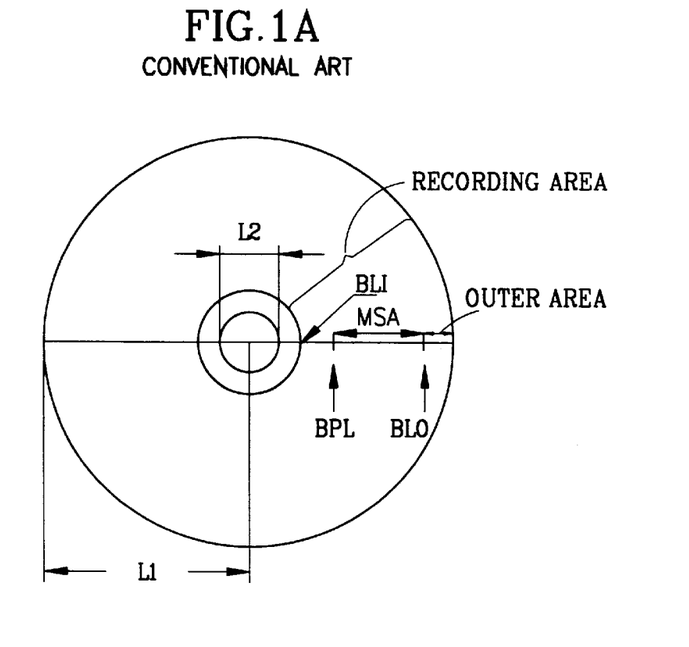
FIGS. 1A and 1B illustrate conventional optical disks.
Figure 1B:
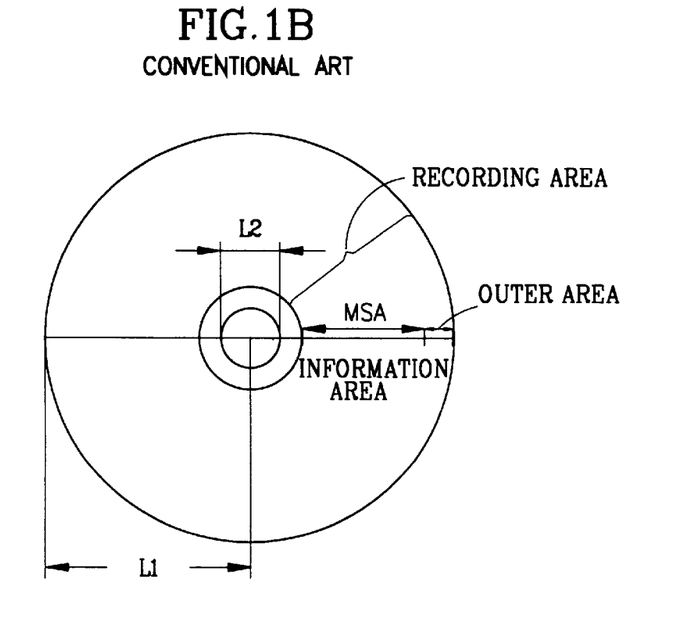

FIGS. 1A and 1B illustrate conventional optical disks. The radius L1 of these disks is 60 mm, while the diameter L2 of the center hole is 15 mm. FIG. 1A illustrates a conventional prerecorded optical disk. As shown in FIG. 1A, a recording area of the optical disk includes a lead-in start point BLI, a main storage area start point BPL, and a lead-out start point BLO. Information is written in the main storage area MSA between the main storage area start point BPL and lead-out start point BLO.

FIG. 1B illustrates a conventional write-once optical disk upon which no information has been recorded. As with the optical disk of FIG. 1A, the optical disk of FIG. 12 has a recording area, and when information is recorded thereon, this information is recorded in a main storage area MSA. As shown in both FIGS. 1A and 1B, an outer area of the recording area is not used to store information. This provides a margin of error with respect to manufacturing defects since defects in the recording area are much more likely to occur in the outer area of the recording area due to the manufacturing techniques used.

With magnetic and magneto-optic disks, conventional quality test methods involved recording signals in the lead-in area or main storage area of the disks, reproducing those test signals, and comparing the test signals to reference signals to determine quality;

These methods have been applied to the quality testing of optical disks. Unfortunately, however, these methods cannot be applied to every optical disk manufactured. For instance, once test data is written into a write-once optical disk, that disk loses its value as a commercial good because it becomes unusable. Accordingly, samples from a plurality of manufactured optical disks are taken and tested according to the above-described methodology.

Besides rendering the sampled disks unusable, these quality testing techniques also prove to be inaccurate and unreliable. Just because the sampled disks may be of sufficient quality does not necessarily mean that the other disks, not sampled, are of sufficiently high quality. Therefore, these tests tend to be inaccurate and unreliable.

These optical disk media also undergo additional quality tests. For instance, the entire surface of the optical disk is displayed by monitoring the scanning of the optical disk surface with a laser beam using a CCD camera. The surface is then visually checked using the display.

Other tests include push/pull, crosstalk, and checking the location of the lead-in start point BLI, main storage area start point BPL, and lead-out start point BLO.

Through the above described test process, mechanical characteristic measurements such as the lead-in start point BLI, the main storage area start point BPL, the lead-out start point BLO, a track and index start point, a test speed, a track pitch, a bow deflection, a warp deflection, a thickness of the optical disk, an angular deflection, a vertical deflection, the radius of the optical disk, and the diameter of the center hole of the optical disk are checked. In addition, signal characteristics such as radial noise, focal noise, push/pull of a tracking signal, data carrier analog, and carrier digital are checked.

SUMMARY OF THE INVENTION

One object of the present invention is to provide a method and apparatus for testing the quality of an optical disk which overcomes the drawbacks and disadvantages discussed above.

Another object of the present invention is to provide a method and apparatus for testing the quality of an optical disk which has improved reliability and accuracy.

A further object of the present invention is to provide a method and apparatus for testing the quality of an optical disk which allows an optical disk to be both quality tested and usable thereafter.

A still further object of the present invention is to provide an optical disk medium which overcomes the drawbacks and disadvantages discussed above.

These and other objects are achieved by providing a method for testing quality of an optical disk medium, comprising: reproducing test data in an outer area of said optical disk medium to produce a test signal, said outer area of said optical disk medium being located circumferentially outside of a main information storage area; and judging quality of said optical disk medium based on said reproduced test signal.

These and other objects are still further achieved by providing an apparatus for testing quality of an optical disk medium, comprising: an optical pick-up reproducing test data in an outer area of said optical disk medium to produce a test signal, said outer area of said optical disk medium being located circumferentially outside of a main information storage area; and judging means for judging quality of said optical disk medium based on said reproduced test signal.

The objects of the present invention are also achieved by providing an optical disk medium, comprising: a main information storage area; and an outer area, circumferentially outside said main information storage area, storing a test signal.

The objects of the present invention are still further achieved by providing a method for recording a test signal in an optical disk medium, comprising: positioning an optical pick-up at an outer area of said optical disk medium to produce a test signal, said outer area of said optical disk medium being located circumferentially outside of a main information storage area; and recording test data in said outer area.

The objects of the present invention are additionally achieved by providing an apparatus for recording a test signal in an optical disk medium, comprising: an optical pick-up; control means for positioning said optical pick-up at an outer area of said optical disk medium, said outer area of said optical disk medium being located circumferentially outside of a main information storage area, and for recording test data in said outer area using said optical pick-up.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 6:
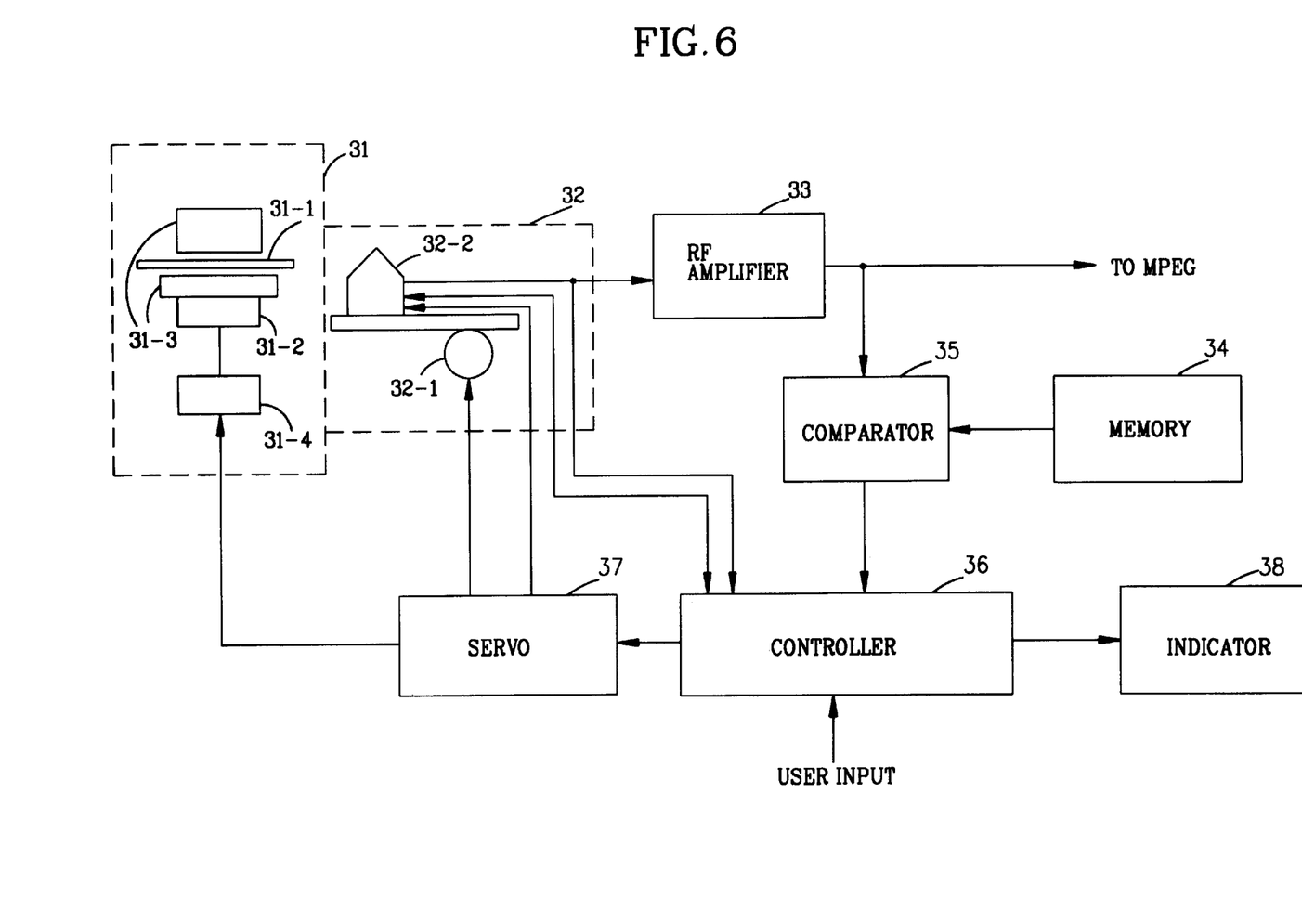
FIG. 6 is a block diagram of an apparatus for recording test data in an optical disk and for testing optical disk quality.

FIG. 6 illustrates the apparatus for recording test data on an optical disk and for testing the quality of an optical disk according to the present invention (hereinafter "the optical disk quality test apparatus"). As shown, the optical disk quality test apparatus includes a drive unit 31 and a pick-up unit 32. The drive unit 31 includes a tray 31-2 for supporting an optical disk 31-1 to be played, a clamp 31-3 for clamping the optical disk 31-1, and a spindle motor 31-4 for rotating the optical disk 31-1. The pick-up unit 32 includes a pick-up 32-2 for writing information on and reading information from the optical disk 31-1. A slide motor 32-1 moves the pick-up 32-2 radially with respect to the optical disk 31-1.

A controller 36 controls the operation of the spindle motor 31-4 and the slide motor 32-1 via a servo 37 based on user input and focus error and tracking error signals from the pick-up unit 32. When instructed by a user to record test data on the optical disk 31-1, the controller 36 supplies the test data to be written onto the optical disk 31-1 to the pick-up unit 32, and controls the recording of the test data.

When instructed by a user to perform a quality test on the optical disk 31-1, the controller 36 controls the pick-up unit 32 to reproduce the test data recorded on the optical disk 31-1. The reproduced signal output by the pick-up unit 32 is supplied to an RF amplifier 33 and the controller 36, while the focus error and tracking error signals are supplied to the controller 36. Based on the focus error and tracking error signals and the reproduced signal, the controller 36 controls the slide motor 32-1 and the spindle motor 31-4 via the servo 37. The RF amplifier 33 processes the reproduced signal from the pick-up unit 32 and outputs the processed reproduced signal for MPEG processing. The processed reproduced signal is also supplied to a comparator 35.

The comparator 35 compares the processed reproduced signal with predetermined data stored by a memory 34. The results of the comparison are output to the controller 36 which determines, based on the comparison results, whether the optical disk 31-1 is of good or poor quality. If the controller 36 determines that the optical disk 31-1 is of poor quality, the controller 36 drives an indicator 38 to indicate the poor quality of the optical disk 31-1 to a user.

Figure 2A:
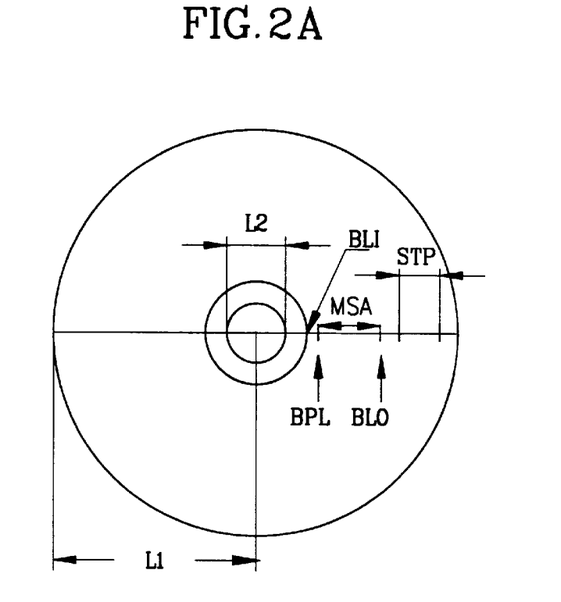
FIGS. 2A and 2B illustrate optical disks according to the present invention.
Figure 2B:
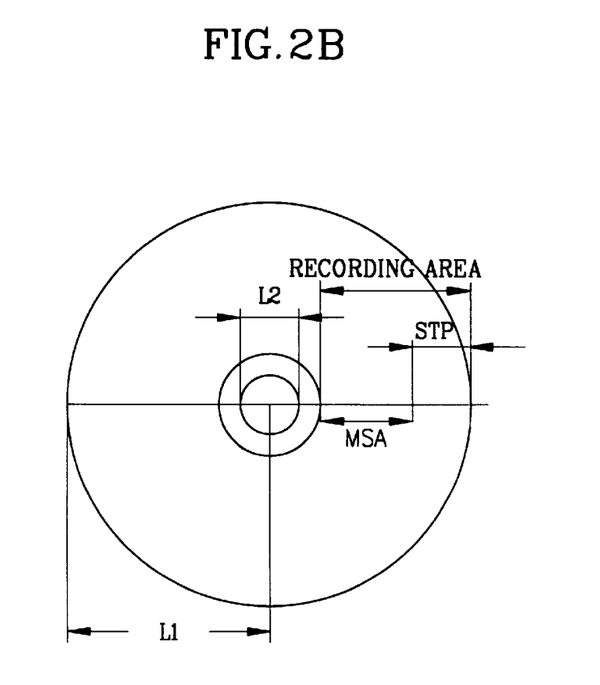

The operation of the optical disk quality test apparatus according to the present invention will be described in detail with respect to FIGS. 2A–9. As shown in FIGS. 2A and 2B, the optical disk quality test apparatus according to the present invention records test data STP in the outer area of an optical disk; both prerecorded (FIG. 2A) and write-once (FIG. 2B) optical disks. This recording operation will be discussed in more detail below with respect to FIGS. 6–8B.

Figure 7:
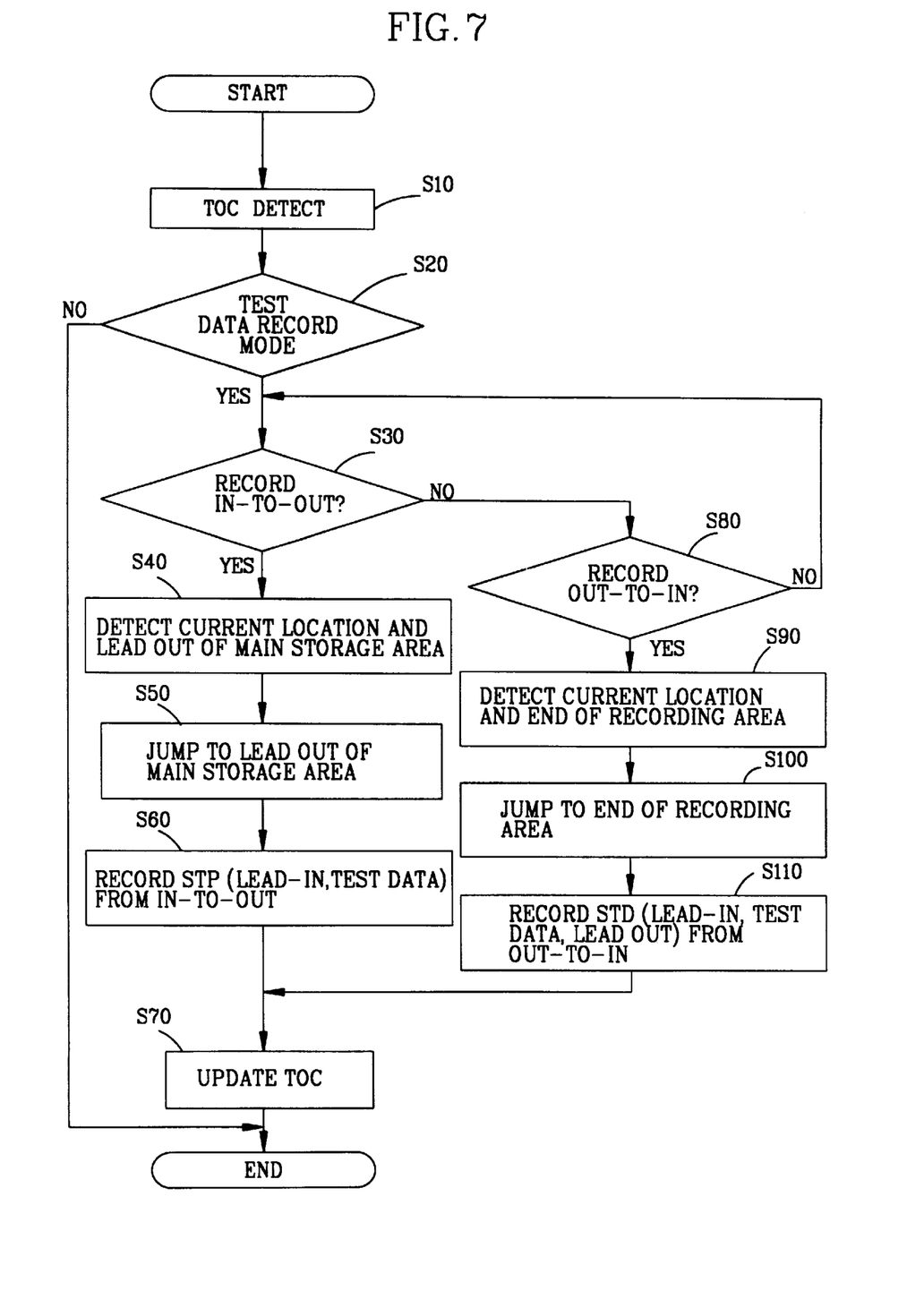
FIG. 7 is a flow chart of the method for recording test data in an optical disk according to the present invention.

FIG. 7 illustrates a flow chart of the method for recording test data in an optical disk according to the present invention. As shown, in step S10, the controller 36 causes the optical pick-up unit 32 to read the Table Of Contents TOC data from the optical disk. The TOC data, recorded near the center of optical disks, indicates the position of, for instance, the lead-in start point for the main storage area, the main storage area, and the lead-out start point for the main storage area in a prerecorded optical disk. For purposes of discussion only, the method of recording test data in an optical disk will be described with respect to a prerecorded optical disk. One skilled in the art, however, will readily appreciate the application of this method to a, for example, write-once optical disk.

After receiving the TOC data from the pick-up unit 32, the controller 36 determines whether a user has selected a test data record mode in step S20. If the test data record mode has not been selected, processing ends. Otherwise, in step S30, the controller 36 determines whether a user has selected an in-to-out recording mode.

If the in-to-out recording mode has been selected in step S30, then in step S40, the controller 36 determines the current location of the pick-up 32-2 in any well known manner, and determines the location of the lead-out start point BLO for the main storage area based on the TOC data. Then, in step S50, the controller 36 moves the pick-up 32-2 to the lead-out of the main storage area based on the detected current location of the pick-up 32-2 and the determined location of the lead-out start point BLO of the main storage area.

Figure 8A:
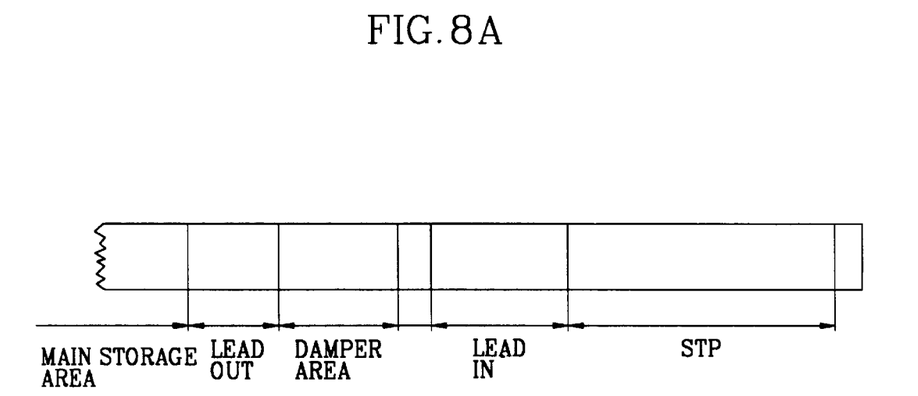
FIGS. 8A and 8B illustrate an information state of the optical disks when test data is written therein according to the present invention.

In step S60, the controller 36 causes the pick-up unit 32 to record test data STP in the optical disk 311 in an in-to-out fashion as shown in FIG. 8A. The test data can be supplied by a user or can be predetermined data stored by the controller 36. The test data can be a predetermined pit pattern, a predetermined bit pattern, or a predetermined signal such as a known musical composition. The test data will be described in more detail below with respect to testing the quality of an optical disk.

The controller 36, as shown in FIG. 8A, controls the pick-up 32-2 to record a lead-in to the test data and the test data while tracking the optical disk and moving from a radially inward position to a radially outward position. In other words, the controller 36 moves the pick-up 32-2 via the slide motor 32-1 and the servo 37 in a radially outward direction of the optical disk during recording of the test data. Additionally, as shown in FIG. 8A, the controller 36 causes the pickup unit 32 to begin recording the lead-in area for the test data STP a predetermined radial distance after the lead-out area of the main storage area to create a damper area between the lead-out of the main storage area and the lead-in of the test data STP.

After recording of the test data is complete, the controller 36 in step S70 updates the TOC data in the optical disk to indicate the location of the test data and the lead-in therefor.

If in step S30 the in-to-out recording mode is not selected, then in step S80, the controller 36 determines whether the out-to-in recording mode has been selected by a user. If the out-to-in recording mode has not been selected, processing returns to step S30. Otherwise, processing proceeds to step S90. In step S90, the controller 36 detects the current location of the pick-up 32-2 in any well known manner, and determines the location of the end of the recording area from the TOC data. Then in step S100 the controller 36 moves the pick-up 32-2 to the end of the recording area.

Figure 8B:
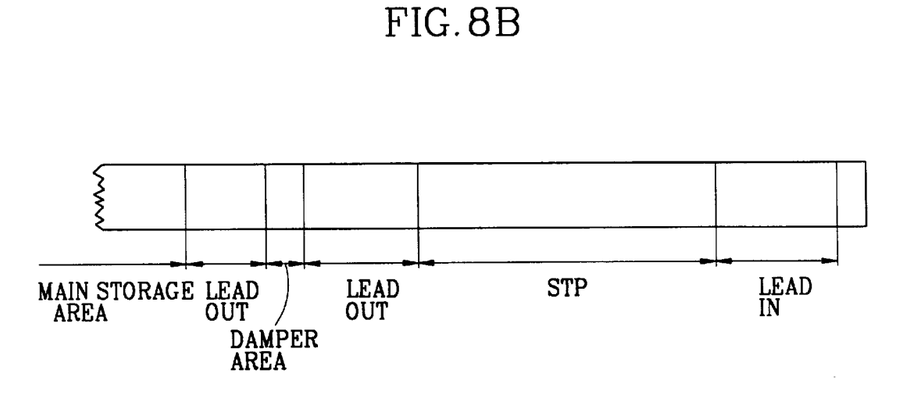

Next in step S110, the controller 36 causes the pick-up unit 32 to record test data in the optical disk in an out-to-in fashion as shown in FIG. 8B. As shown in FIG. 8B, the test data STP is recorded beginning at the end of the recording area and radially inward towards the center of the optical disk. Specifically, as shown in FIG. 8B, a lead-in area to the test data STP is recorded, then the test data STP is recorded, and finally a lead-out for the test data STP is recorded. The lead-out for the test area STP is recorded sufficiently before the beginning of the lead-out for the main storage area such as to leave a damper area between the lead-out for the main storage area and the lead-out for the test data STP. When recording the test data from out-to-in, the controller 36 moves the pick-up 32-2 radially in toward the center of the optical disk while tracking the optical disk.

After recording the test data in step S110, processing proceeds to step S70. In step S70, the controller 36 updates the TOC data for the optical disk to indicate the location of the test data, and the lead-in and lead-out of the test data.

Figure 9:
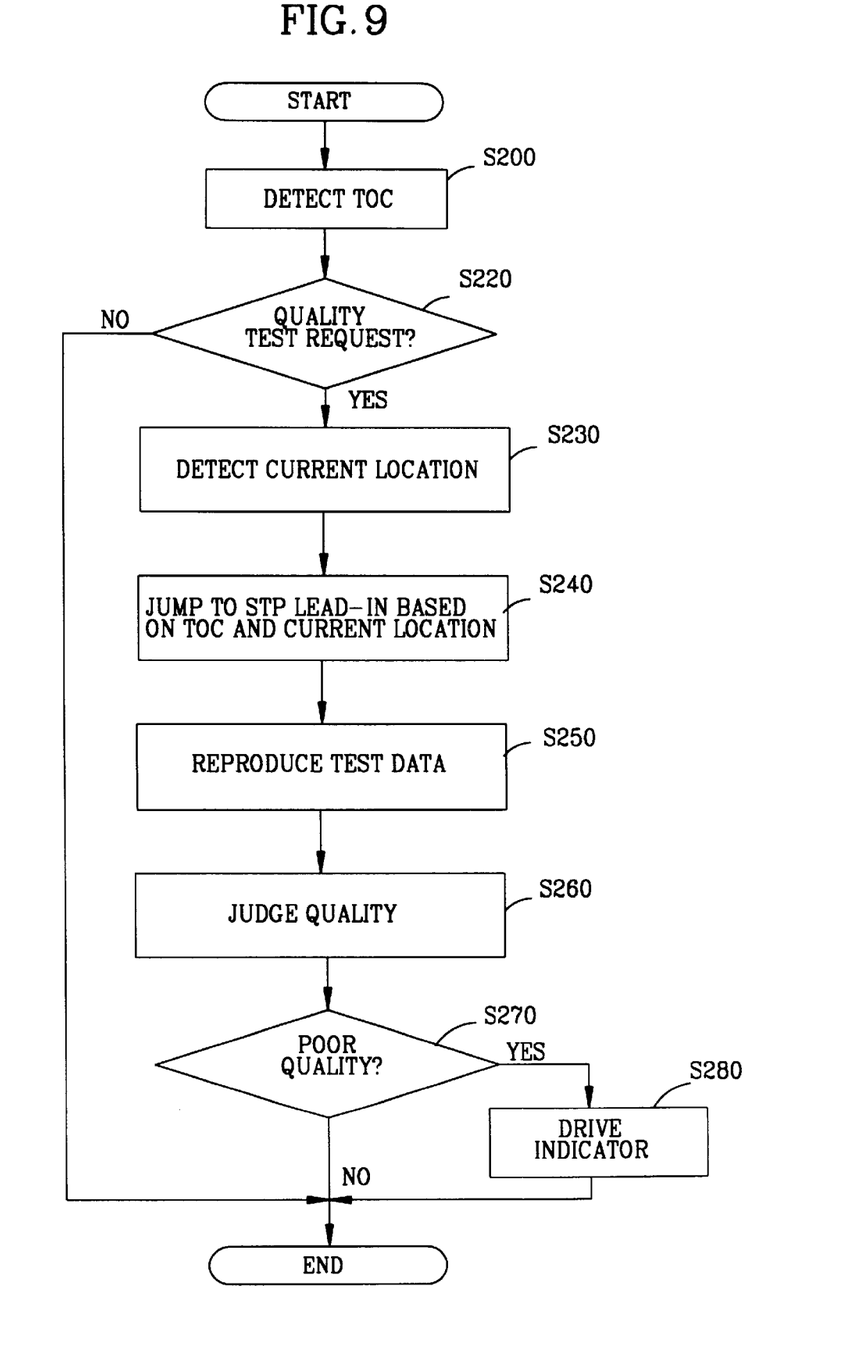
FIG. 9 illustrates a flow chart of the method for testing the quality of an optical disk according to the present invention.

The quality test operation of the optical disk quality test apparatus according to the present invention will now be described with respect to FIGS. 3A–6 and 9. FIG. 9 illustrates the method for testing the quality of an optical disk according to the present invention. As shown in FIG. 9, in step S200, the controller 36 controls the pick-up unit 32 to reproduce and output the TOC data for the optical disk 31-1. Next in step S220, the controller 36 determines whether the user has input a quality test request. If no quality test request has been input, processing ends. If a quality test request has been input, then in step S230, the controller 36 detects the current location of the pick-up 32-2 in any well known manner.

Based on the location of the lead-in for the test data indicated in the TOC data and the current location of the pick-up 32-2, the controller 36 moves the pick-up 32-2 to the lead-in of the test data in step S240. Besides indicating the location of the lead-in for the test data, the TOC data also indicates via this location data whether the test data was recorded radially in-to-out or radially out-to-in. In accordance with this determination, the controller 36 causes the pick-up 32-2 to reproduce the test data in step S250.

Figure 3A:
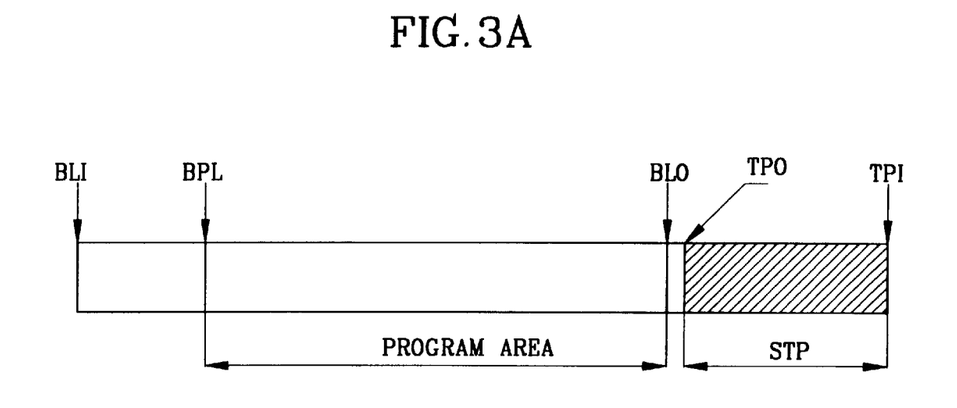
FIGS. 3A and 3B illustrate one method of reproducing test data according to the present invention.
Figure 3B:
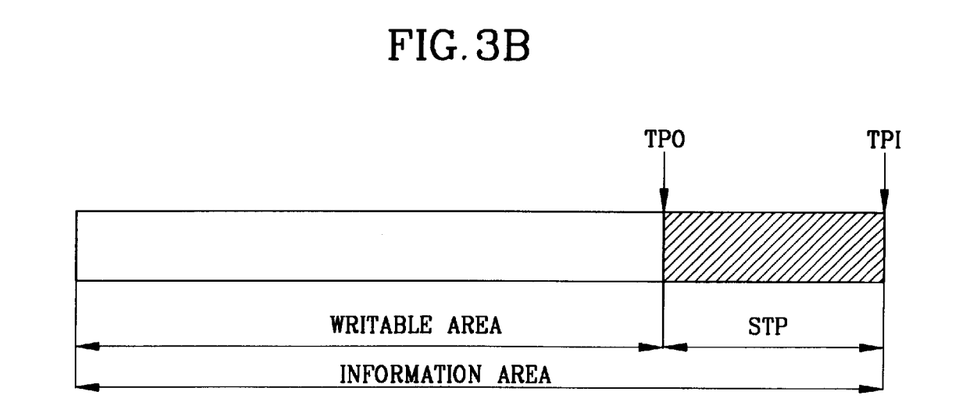
Figure 4A:
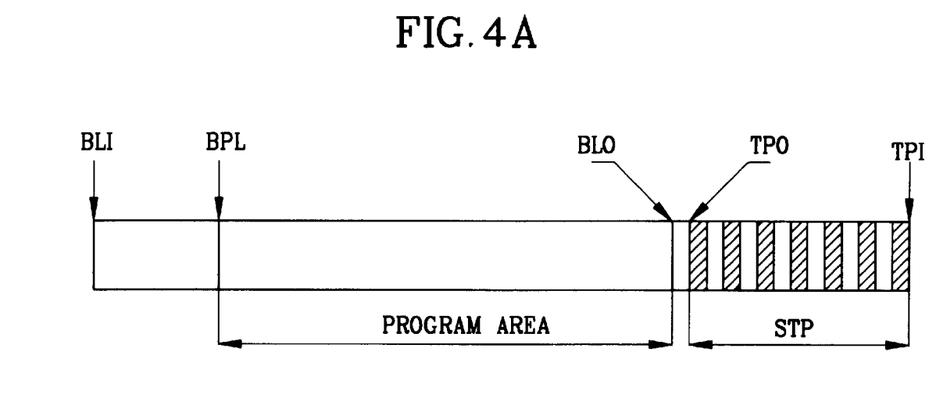
FIGS. 4A and 4B illustrate another method of reproducing test data according to the present invention.
Figure 4B:
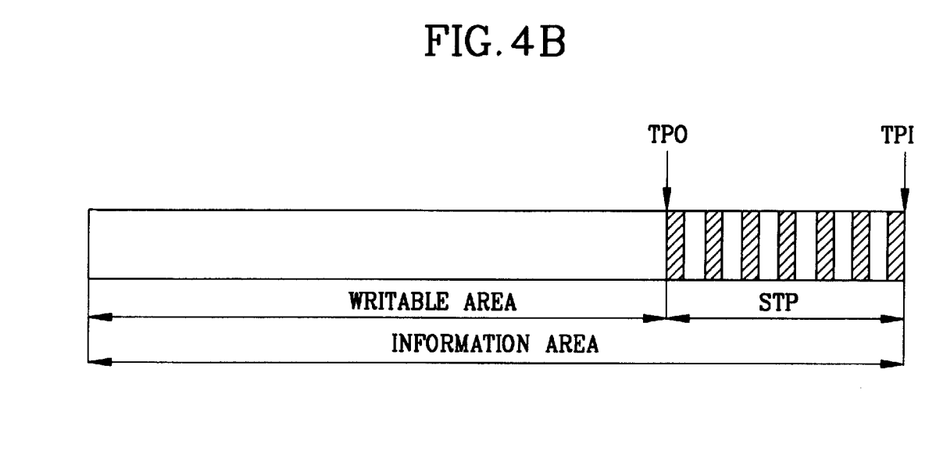
Figure 5A:
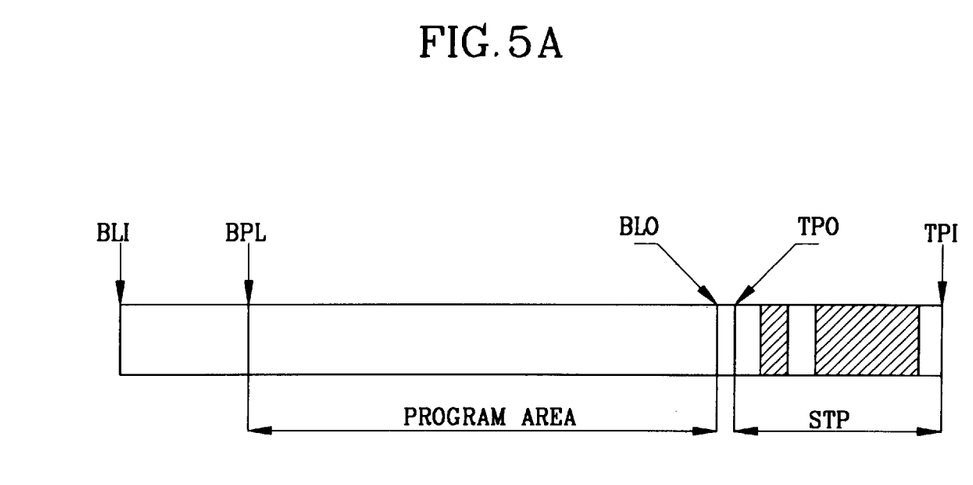
FIGS. 5A and 5B illustrate a further method of reproducing test data according to the present invention.
Figure 5B:
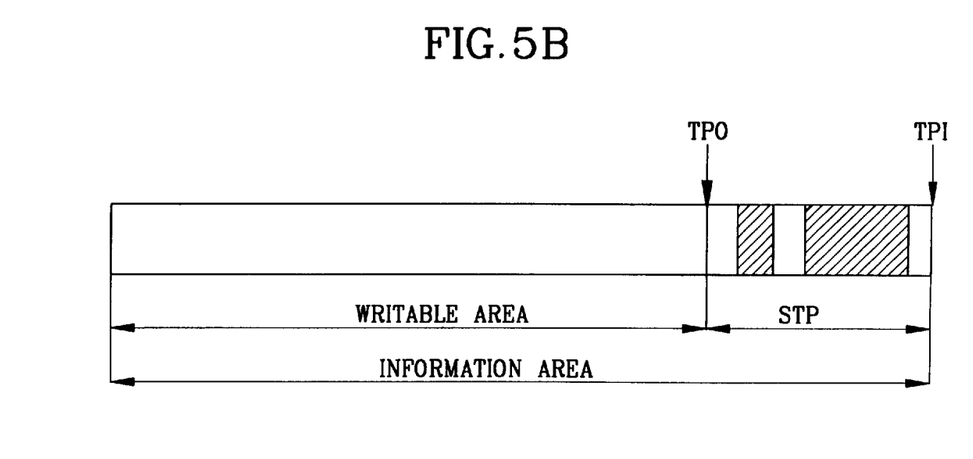

The test data can be sequentially reproduced as shown in FIG. 3A for a prerecorded optical disk or as shown in FIG. 3B for a write-once optical disk, or the test data can be reproduced at predetermined intervals such as shown in FIG. 4A for a prerecorded disk and FIG. 4B for a write-once optical disk. Additionally, predetermined selected portions of the test data can be reproduced such as shown in FIG. 5A for a prerecorded disk and FIG. 5B for a write-once optical disk.

In step S260, the reproduced test data is processed by the RF amplifier 33 and output to the comparator 35. Under the control of the controller 36, the comparator 35 performs a comparison of the test data to predetermined data stored in memory 34, and the controller 36 judges the quality of the optical disk 31-1 based on the comparison results. One or a combination of several quality test operations can be performed by the comparator 35 and the controller 36. These quality test methods include a pit pattern test, a bit pattern test, and an analog signal test.

Figure 10A:
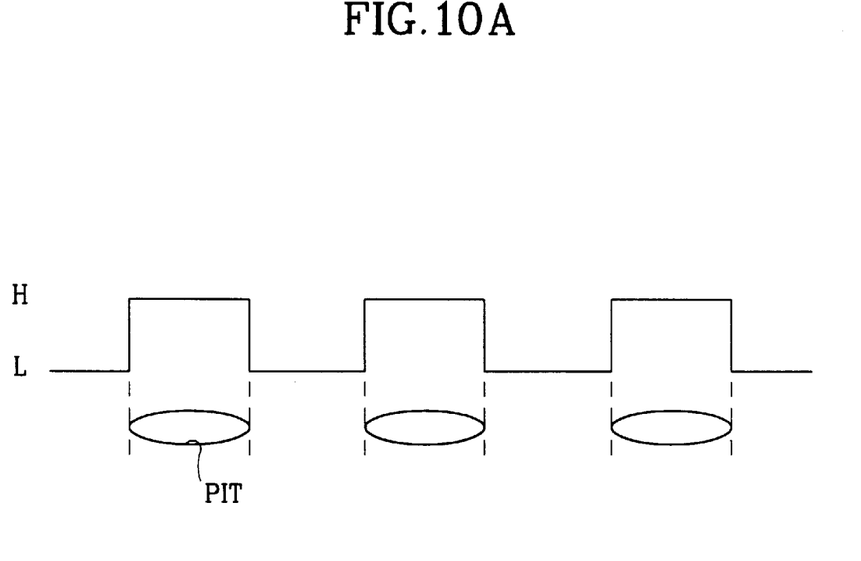
FIG. 10A illustrates the relationship between a pit pattern on an optical disk and a reproduced pit pattern signal.

In a CD and digital video disk (or digital versatile disk) DVD, the smallest bit pattern is 3T while the largest bit pattern for a CD is 11T and for a DVD is 14T. The designation 3T, 4T, etc., is a measure of the pit length which corresponds to a predetermined bit pattern. FIG. 10A illustrates the relationship between the signal output from RF amplifier 33 and the pits representing test data in the optical disk 31-1. As shown in FIG. 10A, the signal output from the RF amplifier 33 transitions from, for example, a low to a high state at the beginning of a pit, remains high for the length of the pit, and transitions from a high to a low state at the end of the pit. The transitioning of the signal output from the RF amplifier 33 represents a bit value of 1, while the length of time that the signal output from the RF amplifier 33 remains high represents a number of 0s. A 3T pit represents the bit stream 1001. A 4T pit, which is longer than a 3T pit, represents the bit pattern 10001. As the pit pattern increases sequentially from 3T to 11T or 14T, so does the number of 0s.

When testing quality using the pit pattern method, the same pit pattern is recorded over an over again as test data. In a preferred embodiment, the pit pattern recorded is the 3T pit pattern. Because the 3T pit pattern is the smallest pit pattern, errors are much more likely to be detected.

The comparator 35 compares the pit pattern signal output by the RF amplifier 33, such as shown in FIG. 10A, to a reference signal stored in the memory 34. The reference signal represents the pit pattern recorded on the optical disk. Each portion of the pit pattern signal representing one pit which matches the reference signal corresponds to recognized data. For instance, when the 3T pit pattern is used, each recognized pit represents four bits of recognized data. The comparator 35 determines the total amount of recognized test data, and then compares the total amount of recognized test data to a predetermined recognized data threshold stored in the memory 34. The memory 34 stores a recognized data threshold associated with each method of reproduction shown in FIGS. 3A–3B, 4A–4B, and 5A–5B (i.e., sequential, periodic, and selected portions). Therefore, depending upon the type of reproduction (sequential, periodic, or selected portions) a different recognized data threshold value is selected and used by the comparator 35. The comparator 35 outputs the results of the comparison to the controller 36.

If the amount of recognized data is greater than the recognized data threshold, the controller 36 determines that the optical disk is of good quality in step S260. Otherwise, the controller 36 determines in step S260 that the optical disk is of poor quality.

Instead of or in addition to the pit pattern test, a bit pattern test can be performed to judge the quality of the optical disk 31-1. In the bit pattern test, the pit pattern signal is converted into a bit stream. Namely, each pit is converted into its representative bits. The resulting bit pattern is compared by the comparator 35 to a reference version of the bit pattern stored in the memory 34. Unlike the pit pattern test, the bit pattern test does not require that the same pit pattern be recorded over and over in the optical disk 31-1 as test data. Any predetermined pit arrangement can be recorded in the optical disk 31-1 as test data. The reference bit pattern stored in the memory 34 corresponds to the pit pattern recorded in the optical disk 31-1.

The comparator 35 compares the bit pattern derived from the pit pattern signal to the reference bit pattern on a pit-by-pit basis. In other words, each group of bits corresponding to a pit is compared to a corresponding group of bits in the reference bit pattern. If a match exists, the matching bits are considered as recognized. The comparator 35 sums the total amount of recognized data, and compares the total recognized amount of data to a predetermined recognized data threshold stored in the memory 34. The result of the comparison is output to the controller 36. As with the pit pattern test, the memory 34 stores recognized data thresholds associated with the sequential, periodic, and selected portions modes of reproduction. Therefore, the recognized data threshold depends upon the mode of reproduction (sequential, periodic, or portions).

The controller 36 determines that the optical disk 31-1 is of good quality if the total amount of recognized data exceeds the recognized data threshold; otherwise, the controller 36 determines that the optical disk 31-1 is of poor quality.

Figure 10B:
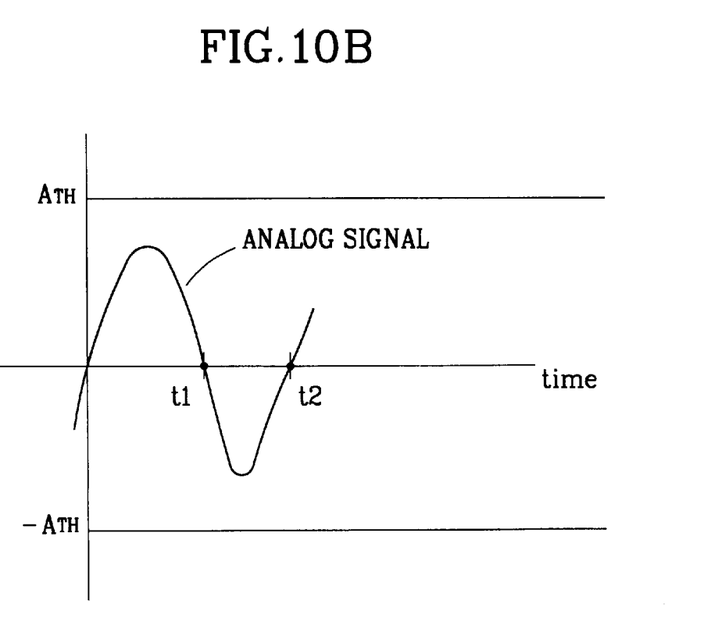
FIG. 10B illustrates a sample of a reproduced analog signal.

Instead of or in addition to both or either of the pit pattern test and the bit pattern test, an analog signal test can be performed to determine the quality of the optical disk 31-1. In this analog signal test, the bit pattern derived from the pit pattern signal is digital-to-analog converted by the comparator 35 to obtain an analog signal such as shown in FIG. 10B. The comparator 35 then performs either or both of an amplitude and frequency test on the analog signal. In the amplitude test, the comparator 35 compares the amplitude of the analog signal to an amplitude threshold range indicated as $A_{TH}$ and $-A_{TH}$ in FIG. 10B.

In the frequency test, the comparator 35 compares the zero crossover points such as t1 and t2 shown in FIG. 10B to predetermined time threshold ranges corresponding to each crossover point. More specifically, because the test data recorded on the optical disk 31-1 is predetermined, the resulting analog signal is also known; and therefore, the zero crossover points are known. Factoring in an empirically determined margin of error for these zero crossover points results in a time threshold range for each of the zero crossover points of the reproduced analog signal. The time threshold range for each zero crossover point is then stored in the memory 34.

Of course, as with the other test methods, the stored time threshold ranges used depend upon the reproduction mode (sequential, periodic, or selected portions).

The quality of the optical disk 31-1 can be judged based on the amplitude test, the frequency test, or both the amplitude and frequency tests. If the amplitude of the analog signal exceeds the amplitude threshold range, then the controller 36 determines that the optical disk 31-1 is poor quality. Also, if a zero crossover point of the analog signal falls outside the corresponding time threshold range, the controller 36 determines that the optical disk 31-1 is of poor quality. If the controller 36 does not reach a poor quality judgement based on the amplitude test, the frequency test, or both the amplitude and frequency test, then the controller 36 determines that the optical disk 31-1 is of good quality.

Next, in step S270, if the controller 36 judges the optical disk 31-1 to be of poor quality, then processing proceeds to step S280, and the controller 36 drives the indicator 38 and processing ends. In this manner, a user is alerted that the optical disk under test is a poor quality optical disk. If the optical disk is judged to be of good quality in step S270, then processing ends.

As discussed above, the pit pattern test, the bit pattern test, the amplitude test, and the frequency test can be used individually or in conjunction with one another to determine the quality of the optical disk.

Also, in addition to the above described quality testing, the optical disk can undergo additional mechanical and signal quality tests. For instance, the entire surface of the optical disk is displayed by monitoring the scanning of the optical disk surface with a laser beam using a CCD camera. The surface is then visually checked using the display.

Other tests include push/pull, crosstalk, and checking the location of the lead-in start point BLI, main storage area start point BPL, and lead-out start point BLO.

Through the above described test process, mechanical characteristic measurements such as the lead-in start point BLI, the main storage area start point BPL, the lead-out start point BLO, a track and index start point, a test speed, a track pitch, a bow deflection, a warp deflection, a thickness of the optical disk, an angular deflection, a vertical deflection, the radius of the optical disk, and the diameter of the center hole of the optical disk are checked.

The method and apparatus for testing the quality of an optical disk according to the present invention record and reproduce test data from an outer area of the optical disk. This area is not used in either prerecorded optical disks or write-once optical disks. Therefore, each disk manufactured can have its quality tested according to the present invention without rendering that optical disk useless as a commercial product. As a result, the quality testing according to the present invention is much more accurate and reliable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for testing quality of an optical disk medium, comprising:

first selecting one of a sequential, periodic and portion reproduction mode;

reproducing test data in an outer area of said optical disk medium based on said selected reproduction mode to produce a test signal, said test data being reproduced sequentially when said sequential reproduction mode is selected, portions of said test data being reproduced at a periodic interval when said periodic reproduction mode is selected, at least one portion of said test data being reproduced in said portion reproduction mode, and said outer area of said optical disk medium being located circumferentially outside of a main information storage area;

second selecting a threshold value depending upon said selected reproduction mode; and judging quality of said optical disk medium based on said reproduced test signal and said selected threshold value.

2. The method of claim 1, further comprising:

indicating a quality state of said optical disk medium to an operator.

* * * * *